(12) United States Patent
Kittaneh et al.

(10) Patent No.: US 10,036,936 B2
(45) Date of Patent: Jul. 31, 2018

(54) CAMERA MOUNT

(71) Applicant: OCLU LLC, Tempe, AZ (US)

(72) Inventors: Firas Kittaneh, Tempe, AZ (US);
Hugo Martin, Oxfordshire (GB);
Robert William Moore, Berkshire (GB)

(73) Assignee: OCLU LLC, Tempe, AZ (US)

( * ) Notice: Subject to any disclaimer, the term of this patent is extended or adjusted under 35 U.S.C. 154(b) by 2 days.

(21) Appl. No.: 15/084,306

(22) Filed: Mar. 29, 2016

(65) Prior Publication Data
US 2017/0299948 A1    Oct. 19, 2017

(51) Int. Cl.
| G03B 17/56 | (2006.01) |
| F16M 11/06 | (2006.01) |
| F16M 13/02 | (2006.01) |
| F16M 11/10 | (2006.01) |

(52) U.S. Cl.
CPC .......... *G03B 17/561* (2013.01); *F16M 11/06* (2013.01); *F16M 13/02* (2013.01); *F16M 11/10* (2013.01); *F16M 2200/022* (2013.01)

(58) Field of Classification Search
None
See application file for complete search history.

(56) References Cited

U.S. PATENT DOCUMENTS

| 6,007,038 | A * | 12/1999 | Han | F16M 11/10 248/346.06 |
| 6,168,126 | B1 * | 1/2001 | Stafford | B60R 11/02 248/122.1 |
| 6,315,180 | B1 * | 11/2001 | Watkins | B60R 11/04 224/275 |
| 8,763,168 | B2 * | 7/2014 | Zhou | A47K 13/26 4/236 |
| D746,353 | S | 12/2015 | Woodman et al. | |
| 9,213,218 | B1 | 12/2015 | Coons | |
| 9,229,299 | B1 * | 1/2016 | Morlon | G03B 17/561 |
| 2010/0061711 | A1 * | 3/2010 | Woodman | B63B 25/002 396/428 |
| 2010/0215355 | A1 | 8/2010 | Olien | |
| 2013/0148951 | A1 | 6/2013 | Zhang | |
| 2013/0184033 | A1 * | 7/2013 | Willenborg | H04M 1/04 455/557 |
| 2013/0270208 | A1 * | 10/2013 | Walker | B66C 23/70 212/177 |
| 2014/0027591 | A1 | 1/2014 | Fountain | |
| 2014/0105589 | A1 * | 4/2014 | Samuels | F16F 7/00 396/421 |

(Continued)

*Primary Examiner* — WB Perkey
(74) *Attorney, Agent, or Firm* — Weiss & Moy, P.C.; Jeffrey D. Moy

(57) ABSTRACT

A camera mount for supporting a camera unit has a base portion having a first surface, which includes an elongate concave surface feature extending across at least part of the first surface and defining a first axis. Engagement means including a first plurality of protrusions which extend out of, are spaced apart across part of, the first surface, each of the protrusions extending substantially perpendicularly to the axis, and substantially parallel to at least one other of the protrusions. Each of the protrusions defines an aperture therethrough, the apertures being substantially aligned along a second axis, the second axis being substantially parallel to the first axis.

14 Claims, 3 Drawing Sheets

(56) References Cited

U.S. PATENT DOCUMENTS

2014/0321843 A1* 10/2014 Hulse .................. G03B 17/561
396/420
2015/0286115 A1* 10/2015 Koch ....................... B62J 11/00
248/615

* cited by examiner

CAMERA MOUNT

BACKGROUND OF THE INVENTION

1. Filed of the Invention

The present invention relates to a camera mount for supporting a camera assembly. In particular, the present invention relates to a camera mount having a reduced profile.

2. Description of Related Art

It is common to mount a camera on a stand when taking photographs or video footage, in order to steady the camera and therefore capture better clarity of images. Further, it is common to mount a camera, such as an action camera, on the body of a user, their clothing or their equipment in order to record video footage in a hands-free manner during an activity. This is achieved using a camera mount that is attached to a user's person or equipment, to which a camera unit is then attached. For example, the mount may be adhesively engaged with the helmet of a mountain biker and the camera unit then releasably engaged with the mount when the user wishes to capture video footage during the mountain biking activity. As it is important that the camera unit, often housed in a protective water-resistant/water-proof case, is easily attached to and released from the camera mount. In addition, the connection between the camera mount and the camera unit ideally allows the position of the camera unit to be adjusted once engaged with the mount, in order that the camera can be correctly oriented to capture the desired video footage.

There are various mounting mechanisms that are employed in order to achieve this, including the use of one or more fastening pins that are passed through apertures in inter-linking protrusions provided on the mount and corresponding camera unit (camera/camera case), respectively. The outer surface of the fastening pin is threaded and, when engaged with the camera unit, is in threaded engagement with threaded portion or portions provided on the inner walls around the apertures in the inter-linking protrusions.

Securing of the camera unit on the mount requires the tightening of the fastening pin within the apertures. Subsequent adjustment of the camera unit position once mounted, is achieved by loosening the fastening pin whilst retaining it in place within the apertures, rotating the camera unit about an axis through the fastening pin, then re-tightening the fastening pin in place to secure the camera unit in its altered position relative to the mount. Subsequent removal of the camera unit from the mount requires the loosening of the fastening pin, removal of the pin from the apertures and subsequent withdrawal of the camera unit protrusions from the spaces between the camera mount protrusions.

Each of these actions requires that a user has sufficient access to the end of the fastening pin to allow manipulation of the fastening pin. However, as the fastening pin needs to be located between the camera mount and camera unit in order to pass through the apertures in respective protrusions, the presence of the fastening pin contributes to an increased profile of the camera assembly i.e. the height of the arrangement as a whole. It will be appreciated that the higher the profile, the less aerodynamic the camera assembly when mounted, for example, on the equipment or clothing of a user. This can be important in certain activities involving speed, where the lack of aerodynamic design can be detrimental to the performance of the user undertaking the activity, for example, mountain biking etc. It will also be appreciated that an increase profile increases the likelihood of the mounted camera arrangement being knocked by external factors during the activity, for example, overhead branches and the like in the case of mountain biking.

There is therefore a need for a mounted camera arrangement with a reduced profile that still allows sufficient clearance for a fastening pin arrangement for ease of mounting of the camera unit and subsequent adjustment of the position of the camera unit relative to the camera mount.

The present invention seeks to address the problems of the prior art.

BRIEF SUMMARY OF THE INVENTION

Accordingly, a first aspect of the present invention provides a camera mount for supporting a camera unit, the camera mount comprising:
  a base portion having a first surface, which includes an elongate concave surface feature extending across at least part of the first surface and defining a first axis;
  engagement means including a first plurality of protrusions which extend out of, and are spaced apart across part of, the first surface, each of the protrusions extending substantially perpendicularly to the axis, and substantially parallel to at least one other of the protrusions,
  wherein each of the protrusions defines an aperture therethrough, the apertures being substantially aligned along a second axis, the second axis being substantially parallel to the first axis.

Where the base portion includes an elongate concave surface feature, the thickness of that portion of the base portion is reduced relative to the portion of the base portion that is adjacent to the elongate concave surface feature.

When in use, the fastening pin extends through the apertures in the protrusions and across the base portion in a direction parallel to the elongate concave surface feature. The presence of the elongate concave surface feature allows the fastening pin to sit lower relative to the base portion than would be possible without the presence of the elongate concave surface feature. Thus, a camera assembly comprising the camera mount and a camera unit will have a lower profile than a similar camera assembly that omits the elongate concave surface features.

The lowered profile of the camera assembly provides the assembly with a more streamlined silhouette. This provides the advantage that the camera assembly, when mounted on a helmet or the like will have a lower profile and therefore a reduced likelihood of getting bumped by or caught on overhead branches etc., as well as contribute less air drag than prior art assemblies. All this is achieved without compromising the space provided for the fastener to access the apertures in the protrusions or the ability of a user to access the end of the fastener to operate the fastener when required.

In one embodiment, the concave surface extends across the first surface from a first protrusion to a first edge of the first surface.

Preferably, the concave surface extends across the first surface from a first edge of the first surface to a second opposing edge of the first surface. A fixed bold is provided on one side of the fastener such that the fastener may only be inserted through the apertures of each protrusion in a single direction only. However, it is to be appreciated that this arrangement may be modified such that a user may insert the fastener from either side of the apertures.

It is to be appreciated that the camera may be located relative to the mount in either a front-facing direction i.e. when the user wishes to record events in the forward direction (e.g. when filming or in a rear-facing direction) or in a rear-facing direction i.e. when the user wishes to film themselves (e.g. when surfing).

Preferably, the apertures of each protrusion are aligned with one another. Although it will be appreciated that a camera unit could still be effectively mounted if only two apertures were aligned as this would be sufficient to allow a camera unit to be mounted on the camera mount and secured in place using a fastening pin extending through two apertures in protrusions on the camera mount and at least one aperture in an aligned protrusion on the camera unit.

In a further embodiment the apertures in each protrusion are equal in size. However, it is to be appreciated that the apertures may decrease in size in a direction away from the direction of insertion of a fastener, in use. This would facilitate a frictional fit of a fastener within the apertures, in use, particularly if the inner surfaces of one or more of the apertures and/or the outer surface of the fastener is composed, at least in part, of a material with high frictional properties, rather than employing a threaded engagement arrangement.

Preferably, a metal threaded bolt is provided on one side of the arrangement of protrusions and the threaded fastener is held in threaded engagement with the threaded bolt and thereby held in place within the aligned apertures of the protrusions.

Alternatively, the interior surface of at least one aperture is threaded. Thus, a fastener, provided with corresponding threads on at least a portion of its outer surface could be held in place relative to, and secured in threaded engagement with, the protrusions.

Preferably, the apertures in each protrusion are dimensioned to receive a fastening pin therethrough. However it will be appreciated that two fastening pins may be used, one fastener inserted from each opposing side of the base portion.

A further aspect of the present invention provides a camera mount according to a first aspect of the present invention, further comprising a fastening pin.

In one embodiment, at least a portion of the outer surface of the fastening pin is threaded for engagement with an interior threaded surface of at least one aperture.

Preferably, the fastening pin extends away from the protrusions in a direction parallel to the first axis and spaced from the elongate concave surface.

A further aspect of the present invention provides a camera assembly comprising a camera mount according to a first aspect of the present invention, and a camera unit comprising a base portion having a base surface, and engagement means including a second plurality of protrusions which extend out of, and are spaced apart across part of, the base surface, each of the protrusions extending away from the base portion, each protrusion being substantially parallel to at least one other of the protrusions, each of the protrusions defining an aperture therethrough, the apertures being substantially aligned along a third axis; and a fastening pin;

wherein, the first and second plurality of protrusions are inter-engagable with one another to bring the respective apertures into alignment along a common axis and wherein the fastening pin is receivable through at least two of the aligned apertures.

In one embodiment, at least a portion of an outer surface of the fastening pin is threaded for engagement with an interior threaded surface of at least one aperture.

Preferably, the fastening pin extends away from the protrusions in a direction parallel to the first axis and spaced from the elongate concave surface.

Preferably, the mount comprises a plurality of materials. For example, the mount may comprise a first durable material providing strength and rigidity to the protrusions/aperture arrangement. Further, the mount base may comprise a second flexible material (for example an elastomeric material) such that the second flexible material flexes to fit the contours of the surface on which the mount base is mounted. The elastomeric material facilitates a good and reliable fit with surfaces of varying contours, and also acts as a natural vibration-absorber during use where the user is undergoing rapid movement. The flexible material is also less brittle than most more rigid materials and so is less prone to breakage during use.

The ability of the mount base to adapt to varying contours of a surface with which it is to be engaged allows one mount to be use for multiple surfaces with varying surface contours, rather than a different mount being required for each different surface.

In a further embodiment, the camera unit defines a cavity for receiving at least a portion of a camera therein. Further, the camera unit may comprise a protective casing for the camera. For example, the camera unit may be a waterproof and/or water-resistant and/or impact resistant casing for a camera. This is of particular use where the camera is being used to record video footage where a high impact or water-sport activity is being undertaken by a user.

An embodiment of the present invention will now be described, by way of example, only, and with reference to the following figures, where:

The same figure references for each feature of the camera assembly are used throughout the figures.

DETAILED DESCRIPTION

Figure 1:
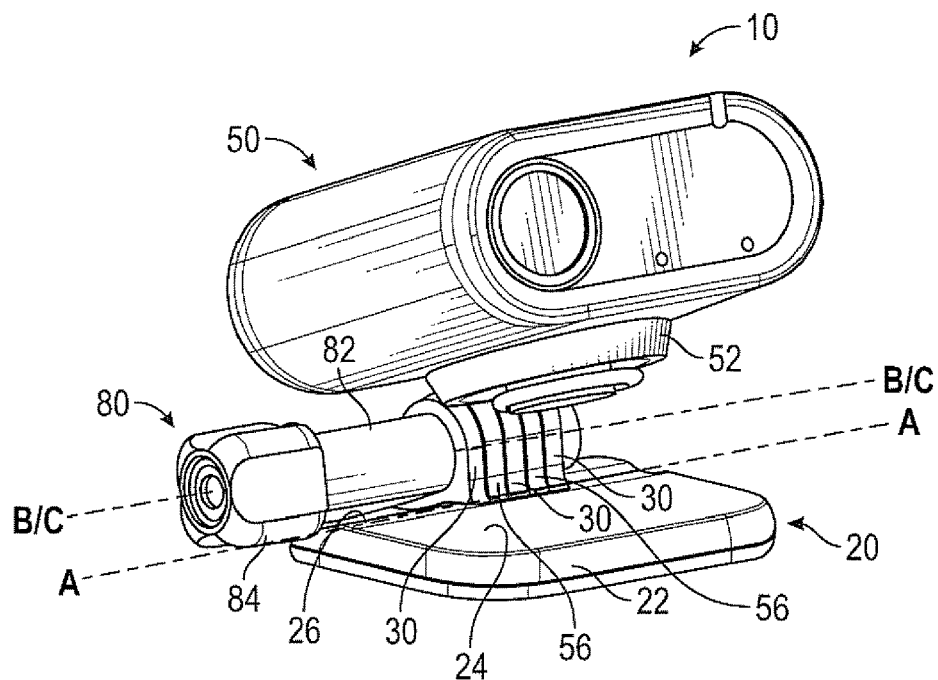
FIG. 1 is a perspective view of the front of a camera assembly in accordance with a first aspect of the present invention.
Figure 2:
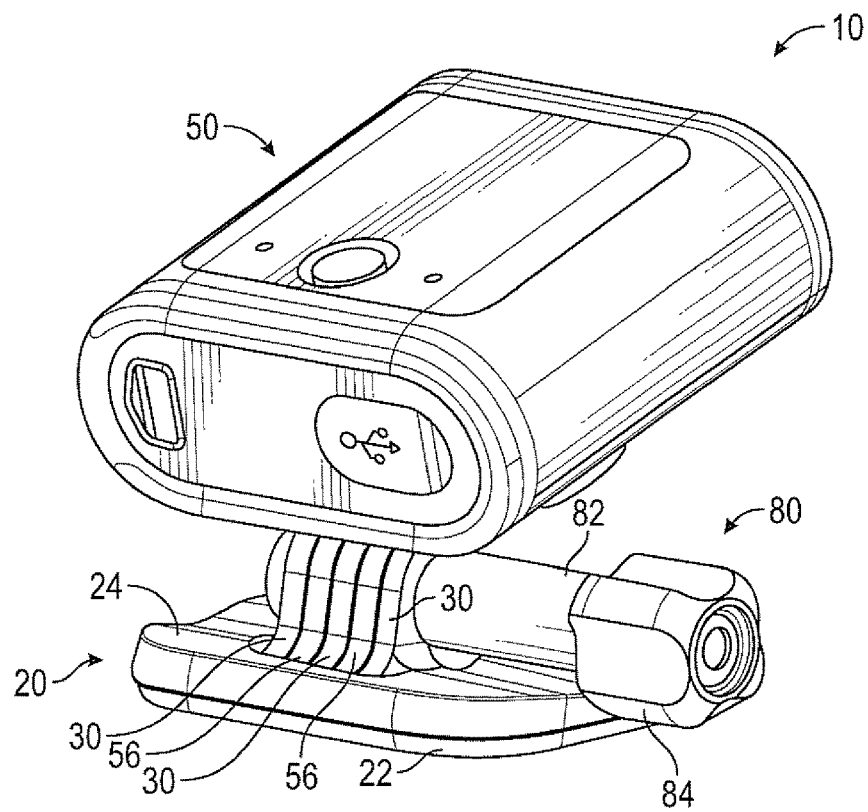
FIG. 2 is a perspective view of the rear of the embodiment of FIG. 1.
Figure 3:
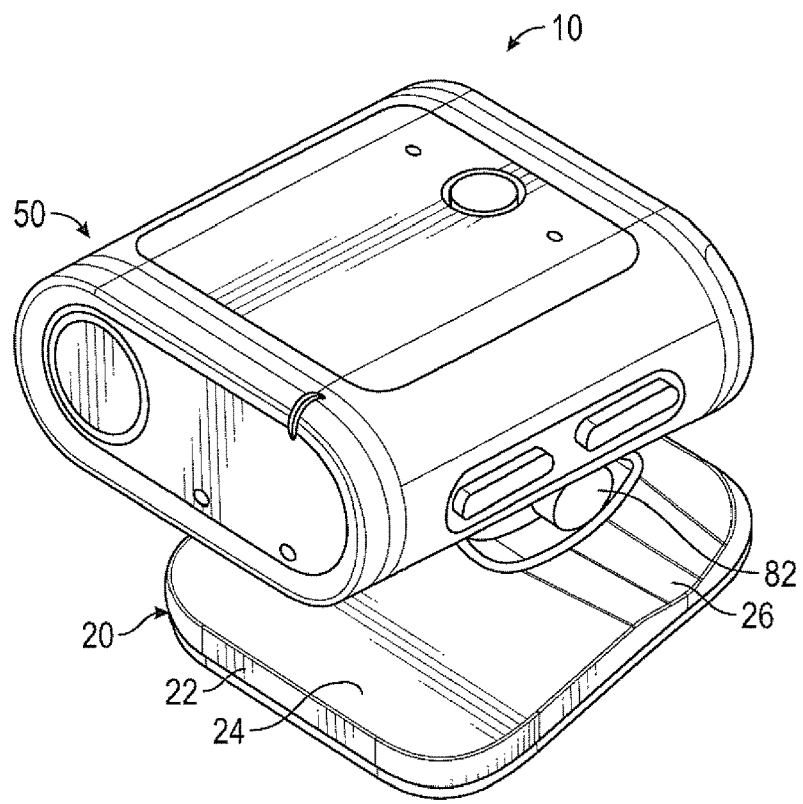
FIG. 3 is a perspective view from above and front of the embodiment of FIG. 1.
Figure 4:
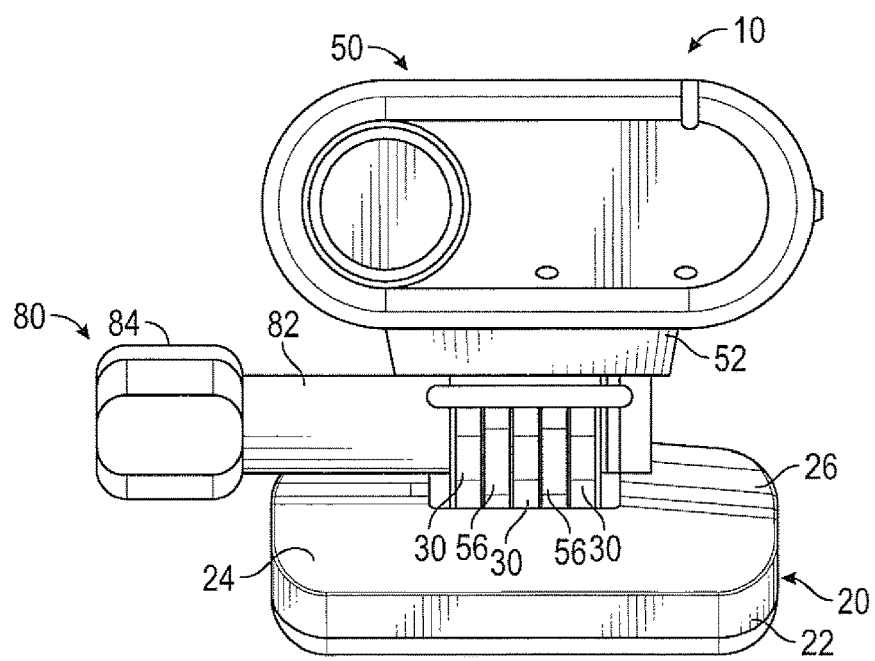
FIG. 4 is a front view of the embodiment of FIG. 1.
Figure 5:
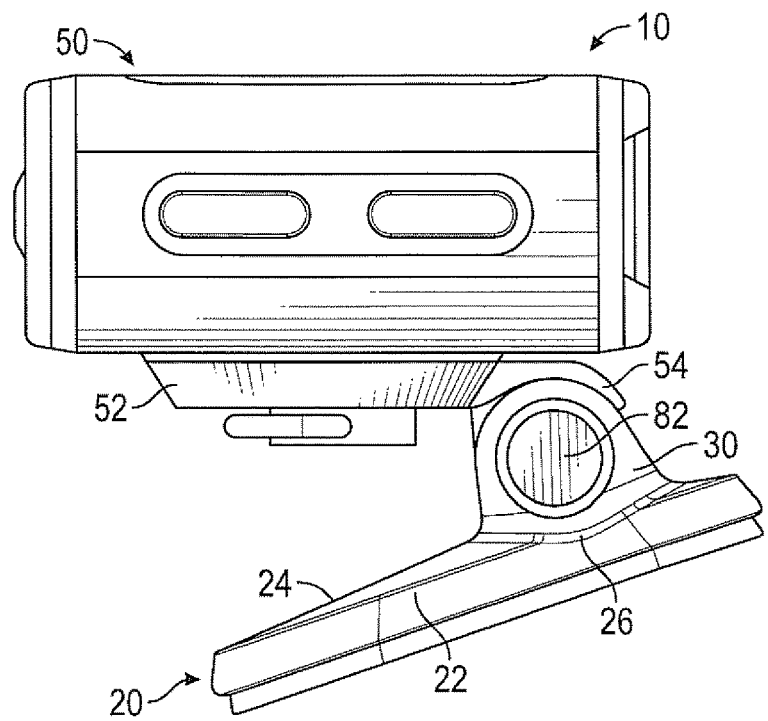
FIG. 5 is a view from a first side of the embodiment of FIG. 1.
Figure 6:
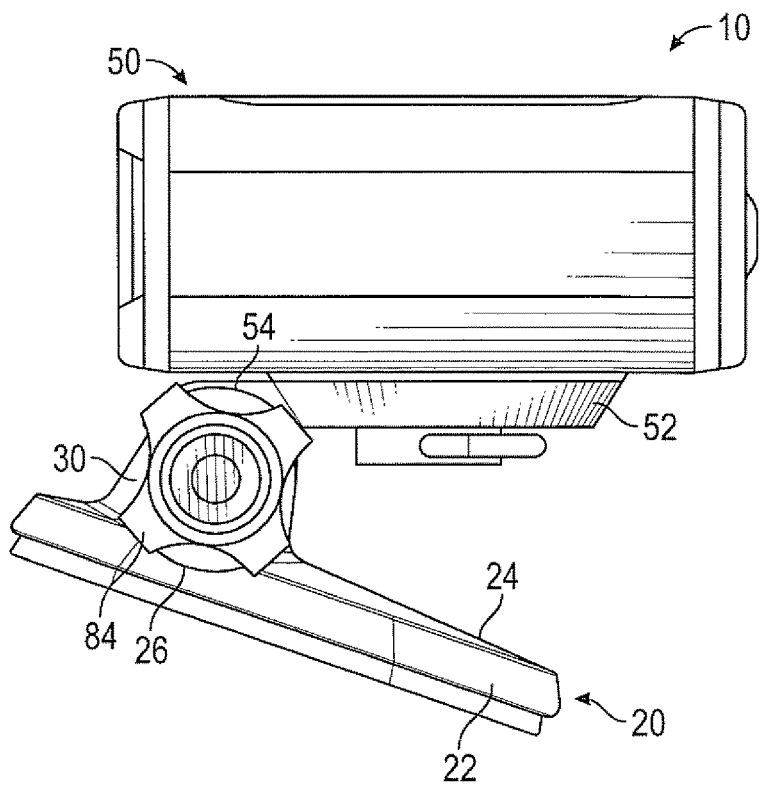
FIG. 6 is a view of the embodiment of FIG. 1 from an opposing side to that of FIG. 5.

FIG. 1 shows a camera assembly 10 in accordance with a first embodiment of the present invention. Camera assembly 10 comprises a camera mount 20, a camera unit 50 and a fastening pin 80.

Camera mount 20 comprises a base portion 22 having a first surface 24 which includes an elongate concave surface 26 extending across at least part of the first surface 24 and defining a first axis, identified as A-A in FIG. 1. Camera mount 20 further comprises engagement means 28 including a first plurality of protrusions 30 which extend out of, and are spaced apart of first surface 24. Each of protrusions 30 extend substantially perpendicular to axis A-A and substantially parallel to at least one other of protrusions 30.

Each protrusion 30 defines an aperture 32 therethrough, the apertures 32 being substantially aligned along a second axis, indicated as B-B in FIG. 1. As can been seen from the figures, axis A-A and axis B-B are substantially parallel to one another.

Camera unit 50 comprises a base portion 52, the base portion 52 having a base surface 54. The base portion is further provided with engagement means 56. Engagement means 56 include a second plurality of protrusions 56, which extend out of, and are spaced across, at least a portion of base surface 54. Each of protrusions 56 extend away from base portion 52, each protrusion 56 being substantially parallel to at least one other of the protrusions 56, each of the protrusions 56 defining an aperture 58 therethrough, the apertures 58 being substantially aligned along a third axis, shown as C-C in FIG. 1.

At least a portion of the inner surfaces of apertures 58 and apertures 32 are provided with threaded portions.

Fastening pin 80 comprises an elongate body 82 and a grip portion 84. At least a portion of elongate body 82 is provided with a threaded portion (not shown) for engagement with the complementary threaded portions on the inner surfaces of apertures 58 and 32. Grip portion 84 of fastening pin 80 is provided with contours to assist a user in gripping and turning the fastening pin 80, in use.

As can be seen from the figures, the camera mount 20 is engaged with camera unit 50 by introducing protrusions 56 of camera unit 50 into the spaces adjacent protrusions 30 of camera mount 20. The apertures 58, 32 of protrusions 56, 30, respectively are aligned so as to bring axes B-B and C-C into alignment with one another. Once apertures 58, 32 are so aligned, fastening pin 80 is aligned along axis B-B and moved towards apertures 58, 32. Fastening pin 80 is then passed through apertures 58, 32 in protrusions 30 by rotating the fastening pin about axis B-B to engage the threaded portion of fastening pin 80 with the threaded portions provided on the inner surfaces of apertures 58, 32. Rotation of the fastening pin 80 in a first direction moves fastening pin 80 through apertures 58, 32, thereby securing the camera mount 20 to the camera unit 50. Rotation of the fastening pin 80 in a second, opposing, direction, would release the fastening pin 80 from apertures 58, 32, thereby disengaging the camera mount 20 and the camera unit 50.

In the event that the fastening pin 80 is rotated in the second direction to loosen the threaded engagement between the fastening pin 80 and the inner surfaces of apertures 58, 32, but the fastening pin 80 is not removed from apertures 58, 32, the position of the camera unit 50 relative to the camera mount 20 can be adjusted by rotating camera unit 50 about aligned axes B-B, C-C. Once the camera unit 50 is in the desired position relative to camera mount 20, fastening pin 80 is then rotated in the first direction to tighten the engagement between camera mount 20 and camera unit 50 to hold the camera unit 50 in position relative to camera mount 20 via frictional fit between fastening pin 80 and apertures 58, 32.

As can be seen from the figures, fastening pin 80 is spatially separated from, but located parallel to elongate concave surface 26 of camera mount 20 i.e. along an axis parallel to axis A-A.

The thickness of base portion 22 of camera mount 20 is greater adjacent to elongate concave surface 26 relative to the thickness of base portion 22 at elongate concave surface 26. The presence of elongate concave surface 26 permits protrusions 30 and apertures 32 of camera mount 20 to be of reduced profile. With the camera assembly 10 arrangement shown in the figures, if elongate concave surface 26 was omitted from the design and the base portion 22 was of equal thickness across the whole of first surface 24, the elongate body 82 of fastening pin 80 would potentially be prevented from rotation due to obstruction by the first surface 24 of base portion 22. The clearance provided between fastening pin 80 and first surface 24 due to the presence of elongate concave surface 26 allows the camera assembly to be of reduced profile whilst allowing fastening pin 80 to rotate freely about axes B-B, C-C without fouling on first surface 24 of camera mount 20. Further, the location of grip portion 84 of fastening pin 80 beyond the edge 34 of first surface 24 of base portion 22 allows a user good access to operate the rotation of fastening pin 80 using grip portion 84.

The reduced profile is advantageous in allowing the camera unit 50 to be located on camera mount 20 in a closer relationship than provided for by traditional camera mounting systems. The reduced profile allows the overall height of the camera assembly 10 to be reduced, thereby providing the advantage of being more stream-lined and less likely to be bumped or damaged whilst the user undertakes physical activities such as, but not limited to, mountain-biking, skiing, climbing and the like.

The invention claimed is:

1. A portable camera mount for supporting a camera unit, the camera mount comprising:
   a base portion having a first surface, which includes an elongate concave surface feature extending in an elongated direction across at least part of the first surface and defining a first axis in the elongated direction;
   engagement means including a first plurality of protrusions which extend out of, and are spaced apart across part of, the first surface, each of the protrusions extending substantially perpendicularly to the axis, and substantially parallel to at least one other of the protrusions,
   wherein each of the protrusions defines an aperture therethrough, the apertures being substantially aligned along a second axis, the second axis being substantially parallel to the first axis.

2. A camera mount according to claim 1, wherein the concave surface extends across the first surface from a first protrusion to an edge of the first surface.

3. A camera mount according to claim 2, wherein the concave surface extends across the first surface from a first edge of the first surface to a second opposing edge of the first surface.

4. A camera mount according to claim 1, wherein the apertures of each protrusion are aligned with one another.

5. A camera mount according to claim 1, wherein the apertures in each protrusion are equal in size.

6. A camera, mount according to claim 1, wherein the interior surface of at least one, aperture is threaded.

7. A camera mount according to claim 1, wherein the apertures in each protrusion are dimensioned to receive a fastening pin therethrough.

8. A camera mount according to claim 5, further comprising a fastening pin.

9. A camera mount according to claim 6, wherein at least a portion of the outer surface of the fastening pin is threaded for engagement with an interior threaded surface of at least one aperture.

10. A camera mount according to any one of claims 7 to 9, wherein the fastening pin extends away from the protrusions in a direction parallel to the first axis and spaced from the elongate concave surface.

11. A camera assembly comprising a camera mount according to any one of claims 1 to 6 and a camera unit comprising a base portion having a base surface, and engagement means including a second plurality of protrusions which extend out of, and are spaced apart across part of, the base surface, each of the protrusions extending away from the base portion, each protrusion being substantially parallel to at least one other of the protrusions, each of the protrusions defining an aperture therethrough, the apertures being substantially aligned along a third axis; and a fastening pin;

wherein, the first and second plurality of protrusions are inter-engagable with one another to bring the respective apertures into alignment along a common axis and wherein the fastening pin is receivable through at least two of the aligned apertures.

12. A camera assembly according to claim 11, wherein at least a portion of an outer surface of the fastening pin is threaded for engagement with an interior threaded surface of at least one aperture.

13. A camera assembly according to claim 11, wherein the fastening pin extends away from the protrusions in a direction parallel to the first axis and spaced from the elongate concave surface.

14. A camera assembly according to claim 11, wherein the camera unit defines a cavity for receiving at least a portion of a camera therein.

* * * * *